US012175705B2

(12) United States Patent
Qu (10) Patent No.: US 12,175,705 B2
(45) Date of Patent: Dec. 24, 2024

(54) METHOD OF DETECTING COLLISION OF OBJECTS, DEVICE, AND STORAGE MEDIUM

(71) Applicant: BEIJING BAIDU NETCOM SCIENCE TECHNOLOGY CO., LTD., Beijing (CN)

(72) Inventor: Da Qu, Beijing (CN)

(73) Assignee: BEIJING BAIDU NETCOM SCIENCE TECHNOLOGY CO., LTD, Beijing (CN)

( * ) Notice: Subject to any disclaimer, the term of this patent is extended or adjusted under 35 U.S.C. 154(b) by 0 days.

(21) Appl. No.: 17/773,328

(22) PCT Filed: Nov. 11, 2021

(86) PCT No.: PCT/CN2021/130014
§ 371 (c)(1),
(2) Date: Apr. 29, 2022

(87) PCT Pub. No.: WO2022/227489
PCT Pub. Date: Nov. 3, 2022

(65) Prior Publication Data
US 2024/0153128 A1 May 9, 2024

(30) Foreign Application Priority Data
Apr. 26, 2021 (CN) .......................... 202110456769.4

(51) Int. Cl.
*G06T 7/73* (2017.01)
*G06T 7/60* (2017.01)

(52) U.S. Cl.
CPC . *G06T 7/73* (2017.01); *G06T 7/60* (2013.01)

(58) Field of Classification Search
None
See application file for complete search history.

(56) References Cited

U.S. PATENT DOCUMENTS

| 2013/0169630 A1* | 7/2013 | Kakihara | G06T 15/20 345/419 |
| 2016/0055666 A1 | 2/2016 | Nilsson et al. | |
| 2020/0364454 A1 | 11/2020 | Mousavian et al. | |

FOREIGN PATENT DOCUMENTS

| CN | 102521852 | | 6/2012 |
| CN | 102914267 | * | 2/2013 |

(Continued)

OTHER PUBLICATIONS

International Search Report and Written Opinion issued in corresponding PCT Patent Application No. PCT/CN2021/130014, dated Oct. 2, 2022.

(Continued)

*Primary Examiner* — Tapas Mazumder
(74) *Attorney, Agent, or Firm* — Pillsbury Winthrop Shaw Pittman, LLP (57) ABSTRACT

A method of detecting a collision of objects, an electronic device and a storage medium, which may be applied to a field of electronic technology, in particular to a field of intelligent transportation and map navigation technology. The method includes: acquiring an attribute information of each of two objects, including a rotation position of the object relative to a predetermined three-dimensional space and a size information of the object projected onto a predetermined two-dimensional plane; determining a size information of a bounding box for each object according to the size information of each object, a center of the bounding box is located at the rotation position of the object; and determining a collision result according to the rotation positions of the two objects and the size information of the bounding boxes for the two objects.

20 Claims, 4 Drawing Sheets

(56) References Cited

FOREIGN PATENT DOCUMENTS

| CN | 105469406 | | 4/2016 |
|---|---|---|---|
| CN | 111437522 | | 7/2020 |
| CN | 112245923 | * | 1/2021 |
| CN | 113077548 | | 7/2021 |
| JP | 2003323636 | | 11/2003 |

OTHER PUBLICATIONS

Grasovsky: ARFoundation—Realize object rotation, translation and scaling (2021).
Office Action issued in corresponding Chinese Application No. 202110456769.4, dated May 11, 2023.
European Search Report issued in corresponding European Patent Application No. 21881357.4, dated Apr. 17, 2023.
M. Figueiredo et al., "A Survey on Collision Detection Techniques for Virtual Environments", Proc. of V Symposium in Virtual Reality, Brasil, vol. 307, pp. 1-24 (2002).
Anonymous, "What is the fastest way to work out 2D bounding box intersection?", Game Development, Stack Exchange (www.stackexchange.com), pp. 1-10 (2010).
Office Action issued in corresponding Japanese Patent Application No. 2022-525298, dated Jul. 4, 2023.

* cited by examiner

METHOD OF DETECTING COLLISION OF OBJECTS, DEVICE, AND STORAGE MEDIUM

This application is the U.S. national phase entry of PCT Patent Application No. PCT/CN2021/130014 filed on Nov. 11, 2021, which claims priority to Chinese Patent Application No. 202110456769.4 filed on Apr. 26, 2021, the content of which is incorporated herein by reference in its entirety.

TECHNICAL FIELD

The present disclosure relates to a field of an electronic technology, in particular to a field of an intelligent transportation and map navigation technology, and more particularly to a method of detecting a collision of objects, a device, and a storage medium.

BACKGROUND

A panoramic technology has emerged with a development of the electronic technology. The panorama technology is a new visual technology, which may bring users a new real sense of presence and an interactive experience.

When setting a panorama display, a panorama two-dimensional image is generally mapped in a created three-dimensional sphere model to create a three-dimensional scene. After the three-dimensional scene is created, a marker and a label information are generally added to the three-dimensional sphere model to provide a guidance information to users.

SUMMARY

There is provided a method of detecting a collision of objects, an electronic device and a storage medium.

According to an aspect of the present disclosure, there is provided a method of detecting a collision of objects, including: acquiring an attribute information of each of two objects, wherein the attribute information includes a rotation position of the object relative to a predetermined three-dimensional space and a size information of the object projected onto a predetermined two-dimensional plane; determining a size information of a bounding box for each object of the two objects based on the size information of the each object, wherein a center of the bounding box is located at the rotation position of the each object; and determining a collision result for the two objects according to the rotation positions of the two objects and the size information of the bounding boxes for the two objects.

According to another aspect of the present disclosure, there is provided an electronic device, including: at least one processor; and a memory communicatively connected to the at least one processor, wherein the memory stores instructions executable by the at least one processor, and the instructions, when executed by the at least one processor, cause the at least one processor to implement the method of detecting the collision of objects provided by the present disclosure.

According to another aspect of the present disclosure, there is provided a non-transitory computer-readable storage medium having computer instructions stored thereon, wherein the computer instructions allow a computer to implement the method of detecting the collision of objects provided by the present disclosure.

It should be understood that content described in this section is not intended to identify key or important features in the embodiments of the present disclosure, nor is it intended to limit the scope of the present disclosure. Other features of the present disclosure will be easily understood through the following description.

BRIEF DESCRIPTION OF THE DRAWINGS

The accompanying drawings are used for better understanding of the present solution and do not constitute a limitation to the present disclosure.

DETAILED DESCRIPTION OF EMBODIMENTS

Exemplary embodiments of the present disclosure will be described below with reference to the accompanying drawings, which include various details of the embodiments of the present disclosure to facilitate understanding and should be considered as merely exemplary. Therefore, those of ordinary skilled in the art should realize that various changes and modifications may be made to the embodiments described herein without departing from the scope and spirit of the present disclosure. Likewise, for clarity and conciseness, descriptions of well-known functions and structures are omitted in the following description.

The present disclosure provides a method of detecting a collision of objects, which includes an information acquisition stage, a size information determination stage and a collision result determination stage. In the information acquisition stage, an attribute information of each of two objects is acquired. The attribute information includes a rotation position of the object relative to a predetermined three-dimensional space and a size information of the object projected onto a predetermined two-dimensional plane. In the size information determination stage, a size information of a bounding box for each of the two objects is determined based on the size information of each of the two objects. A center of the bounding box is located at the rotation position of the object. In the collision result determination stage, a collision result for the two objects is determined according to the rotation positions of the two objects and the size information of the bounding boxes for the two objects.

The application scenario of the method and apparatus provided by the present disclosure will be described below with reference to FIG. 1.

Figure 1:
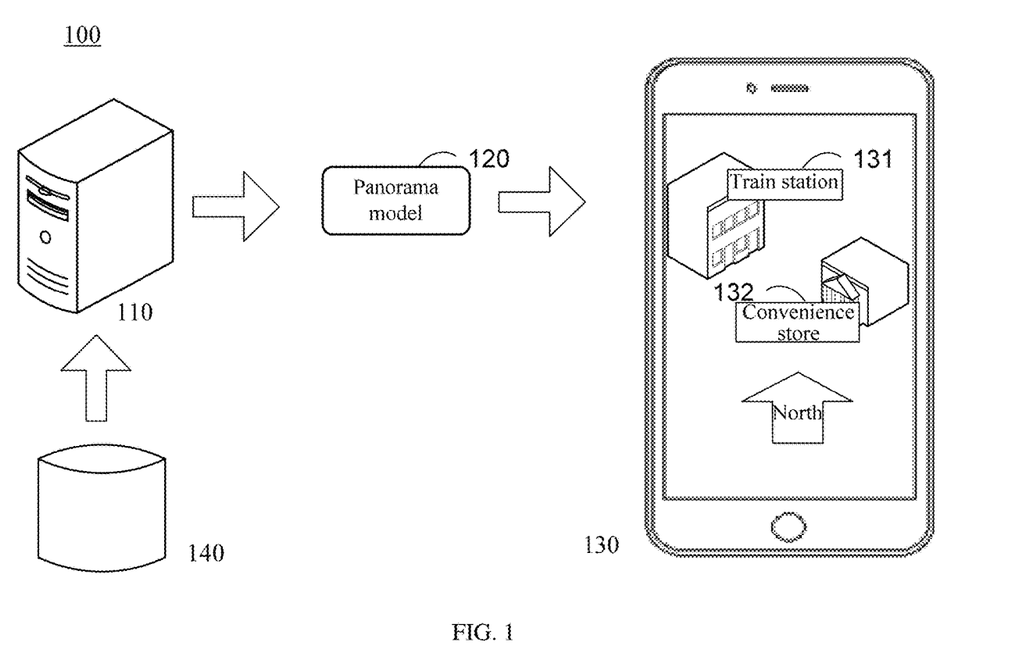
FIG. 1 shows a schematic diagram of an application scenario of a method and an apparatus of detecting a collision of objects, an electronic device and a storage medium according to an embodiment of the present disclosure.

FIG. 1 shows a schematic diagram of an application scenario of a method and an apparatus of detecting a collision of objects, an electronic device and a storage medium according to the embodiment of the present disclosure.

As shown in FIG. 1, the application scenario 100 includes a server 110 and a terminal device 130. The terminal device 130 may be communicatively connected to the server 110 through a network, and the network may include a wired or wireless communication link.

A user may, for example, use the terminal device 130 to interact with the server 110 through the network, so as to receive or transmit a message and the like. The terminal device 130 may be a terminal device having a display screen with a panorama display function, which includes but is not limited to a smart watch, a smart phone, a tablet computer, a laptop computer, and the like.

The terminal device 130 may be, for example, installed with various client applications, such as a shopping application, a web browser application, a search application, an instant messaging tool, a social platform software or a map navigation application (for examples only).

The server 110 may be a server that provides various services, such as a background management server that provides a support for a client application installed on the terminal device 130. The server may be a cloud server, a distributed system server, or a server combined with blockchain.

Exemplarily, the terminal device 130 may, for example, transmit an acquisition request for acquiring a panoramic scene information to the server 110 in response to a user operation. The server 110 may, for example, transmit a panorama model 120 to the terminal device 130 in response to the acquisition request. The panorama model 120 may contain a panorama image and a label information added to an object in the panorama image, etc. After receiving the panorama model 120, the terminal device 130 may render a panorama scene in the running client application, and display a label information added to a display object near the display object. For example, for a train station displayed in the panoramic scene, a label 131 indicating "train station" may be displayed, and for a convenience store displayed in the panoramic scene, a label 132 indicating "convenience store" may be displayed.

According to the embodiments of the present disclosure, as shown in FIG. 1, the application scenario may further include a database 140. The database 140 stores a plurality of images that may be stitched into a panoramic image, or stores a panoramic image. The server 110 may, for example, access the database 140 and construct a panorama model from the image acquired from the database 140. Specifically, a three-dimensional sphere model may be created first, the acquired image may be mapped in the three-dimensional sphere model, and a label may be added to each object. In addition, if a plurality of objects exist in a predetermined region, the server may perform a collision detection on a plurality of labels of the plurality of objects in the predetermined region, and determine a display rule for the plurality of labels according to a result for the collision detection. The display rule may also be carried in the panorama model 120 constructed by the server 110, so that the terminal device may render and display the label of the object.

It should be noted that the method of detecting the collision of objects provided by the present disclosure may be performed by the server 110. Accordingly, the apparatus of detecting the collision of objects provided by the present disclosure may be provided in the server 110. The method of detecting the collision of objects provided by the present disclosure may also be performed by a server or server cluster that is different from the server 110 and capable of communicating with the server 110. Accordingly, the apparatus of detecting the collision of objects provided by the present disclosure may also be provided in the server or server cluster that is different from the server 110 and capable of communicating with the server 110.

It should be understood that the number and type of server, terminal device and database in FIG. 1 are merely illustrative. Any number and type of server, terminal device and database may be provided according to implementation needs.

Figure 2:
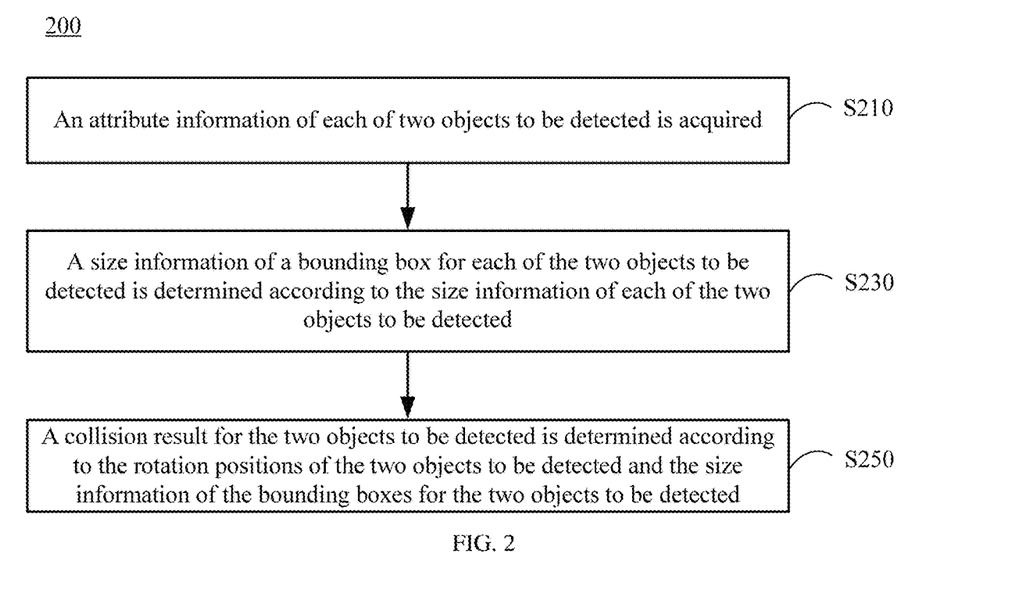
FIG. 2 shows a flowchart of a method of detecting a collision of objects according to an embodiment of the present disclosure.

FIG. 2 shows a flowchart of a method of detecting a collision of objects according to an embodiment of the present disclosure.

As shown in FIG. 2, a method 200 of detecting a collision of objects in this embodiment may include operation S210, operation S230 and operation S250.

In operation S210, an attribute information of each of two objects is acquired.

According to the embodiments of the present disclosure, the attribute information may include a rotation position of the object relative to a predetermined three-dimensional space. The predetermined three-dimensional space may be a three-dimensional sphere model created based on a three-dimensional drawing protocol. Specifically, the three-dimensional sphere model may be constructed by calling a Web Graphics Library (WebGL) of JavaScript. The rotation position may be a position of a center point of the object relative to a center point of the three-dimensional sphere model. The predetermined three-dimensional space is a three-dimensional space formed by the three-dimensional sphere model. It may be understood that the above-mentioned method of constructing the three-dimensional sphere model is only illustrated by way of example to facilitate understanding of the present disclosure, which is not limited in the present disclosure.

Exemplarily, the rotation position may be determined according to an azimuth angle value, a pitch angle value and a distance of the center point of the object relative to the center point of the three-dimensional sphere model.

Exemplarily, considering that two objects that are located in the same azimuth and do not overlap in the three-dimensional sphere model may overlap each other when projected onto a predetermined two-dimensional plane due to the same azimuth angle value and pitch angle value although respective distances from the two objects to the center point are not equal. That is, a result for the collision detection indicates that the two objects collide. Therefore, in this embodiment, the collision detection may be performed only on objects located in different azimuths, that is, two objects with different azimuth angle values and/or different pitch angle values may act as objects. Whether the two objects may overlap or not when projected onto the predetermined two-dimensional plane mainly depends on the azimuth angle value and the pitch angle value of the object. Therefore, the rotation position in this embodiment may only include the azimuth angle value and the pitch angle value of the center point of the object relative to the center point of the predetermined three-dimensional space.

According to the embodiment of the present disclosure, the attribute information may further include a size information of the object projected onto the predetermined two-dimensional plane. The size information may include, for example, a display height and a display width of the object on the predetermined two-dimensional plane. The predetermined two-dimensional plane may be a plane where the display screen of the terminal device is located, and the terminal device is used to display a panoramic picture.

According to the embodiment of the present disclosure, the object may be an object in a panoramic scene, or may be a label added to an object in the panoramic scene.

In operation S230, a size information of a bounding box for each of the two objects is determined according to the size information of each of the two objects.

According to the embodiment of the present disclosure, the size information of the object on the predetermined two-dimensional plane may be converted into a size information in the predetermined three-dimensional space according to a mapping relationship between the predetermined three-dimensional space and the predetermined two-dimensional plane. With the rotation position of the object as a center, a bounding box for the object mapped to the predetermined three-dimensional space may be constructed according to the converted size information in the predetermined three-dimensional space.

Exemplarily, when the bounding box is projected onto the predetermined two-dimensional plane, a projected shape may be, for example, a rectangle, a circle, or an ellipse. The aforementioned structure of the bounding box is only used as an example to facilitate understanding of the present disclosure, which is not limited in the present disclosure.

Exemplarily, in a related art, when the object is a label added to an object in a panoramic scene, a position information of the bounding box is generally determined according to a predetermined size and positioning coordinates of the label relative to an upper left corner of a viewport. That is, the bounding box is constructed based on a two-dimensional plane. Therefore, when the display region in the panoramic scene changes, a position of a center point of the bounding box may also change. Furthermore, since the center point of the bounding box is indicated by the positioning coordinates of the bounding box relative to the upper left corner of the viewport, the greater a distance between the bounding box and the upper left corner of the viewport, the larger a calculation error of the positioning coordinates. In order to solve this problem, in the related art, a real-time collision detection is generally performed on a label of an object in a current field of view when switching the display region, so as to improve a detection accuracy. However, this may undoubtedly result in a problem of a high computational overhead and a low rendering efficiency of the display region after switching.

In the embodiment of the present disclosure, the size information of the bounding box in the predetermined three-dimensional space is obtained by converting the size information of the object in the predetermined two-dimensional plane, and the bounding box in the three-dimensional space is constructed with the rotation position of the object as the center, which may ensure that the position information of the bounding box is not affected by a change in the field of view. Therefore, it is convenient to perform a collision detection on the label before rendering the entire panoramic scene. Compared with a technical solution in the related art in which a real-time detection is required, the calculation overhead may be reduced to a certain extent, a rendering efficiency of a picture in the panoramic scene may be improved, and therefore a user experience may be improved.

In operation S250, a collision result for the two objects is determined according to the rotation positions of the two objects and the size information of the bounding boxes for the two objects.

According to the embodiment of the present disclosure, whether the two bounding boxes overlap or not may be determined according to a distance between the center points of the two bounding boxes and the size information of the two bounding boxes. If the two bounding boxes overlap, the collision result may indicate that the two objects collide. If the two bounding boxes do not overlap, the collision result may indicate that the two objects do not collide.

Exemplarily, since the rotation position of the object acts as the center point of the bounding box, the distance between the center points of the two bounding boxes is a distance between the two rotation positions. In this embodiment, the distance between the two rotation positions may be compared with a size of a space enclosed by the two bounding boxes when the two bounding boxes fit together. If half of a width or half of a height of the enclosed space is greater than the distance between the center points of the two bounding boxes, it may be determined that the two bounding boxes overlap.

To sum up, in this embodiment, by constructing the bounding box in the three-dimensional space with the center point of the object in the predetermined three-dimensional space as the center of the bounding box, an accuracy of the determined position information of the bounding box may be improved. Therefore, the collision detection may be performed on all objects at one time when the panoramic scene is initialized, so that the computational overhead may be saved and the accuracy of the collision detection may be improved.

Figure 3:
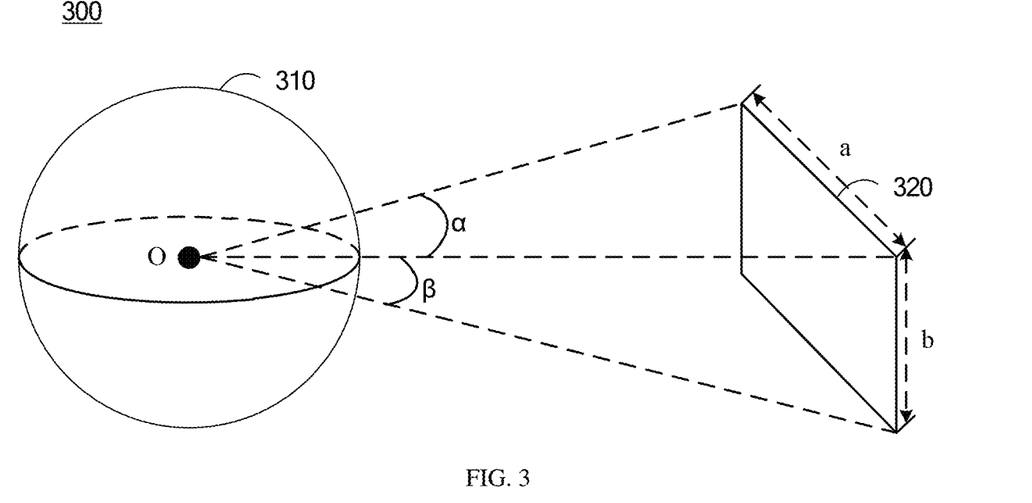
FIG. 3 shows a schematic diagram of determining a mapping relationship between a predetermined two-dimensional plane and a predetermined three-dimensional space according to an embodiment of the present disclosure.

FIG. 3 shows a schematic diagram of determining a mapping relationship between the predetermined two-dimensional plane and the predetermined three-dimensional space according to an embodiment of the present disclosure.

According to the embodiment of the present disclosure, when determining the size information of the bounding box, the mapping relationship between the predetermined two-dimensional plane and the predetermined three-dimensional plane may be determined first. The size information of the bounding box in the three-dimensional space may be obtained by a conversion according to the mapping relationship and the size information of the object projected onto the predetermined two-dimensional plane.

Exemplarily, the mapping relationship may indicate, for example, a relationship between a unit length on the predetermined two-dimensional plane and the rotation angle in the predetermined three-dimensional space. When determining the mapping relationship, a viewing angle value of the center point of the predetermined three-dimensional space in a predetermined direction with respect to the predetermined two-dimensional plane and a width of the predetermined two-dimensional plane in the predetermined direction may be acquired. A ratio of the viewing angle value to the width may act as the mapping relationship between the predetermined two-dimensional plane and the predetermined three-dimensional plane.

Exemplarily, as shown in FIG. 3, an embodiment 300 may be implemented to acquire a viewing angle value a required to view an entire predetermined two-dimensional plane 320 in a width direction or a viewing angle value β required to view the entire predetermined two-dimensional plane 320 in a height direction starting from a center point O of a predetermined three-dimensional space 310. In an embodiment, the viewing angle value of the center point of the predetermined three-dimensional space in the predetermined direction with respect to the predetermined two-dimensional plane refers to a field of view (FOV) value in a horizontal direction or a field of view value in a vertical direction in a camera projection matrix determined according to the predetermined three-dimensional space and the predetermined two-dimensional plane. When the predetermined direction is the horizontal direction, the acquired viewing angle value is a. When the predetermined direction is the vertical direction, the acquired viewing angle value is β.

Exemplarily, as shown in FIG. 3, the embodiment 300 may be implemented to acquire a width a or a height b of the predetermined two-dimensional plane. In an embodiment, the width a and the height b refer to a width and a height of the display screen of the terminal device. When the aforementioned predetermined direction is the horizontal direction, the acquired width is a. When the aforementioned predetermined direction is the vertical direction, the acquired width is b. Accordingly, the mapping relationship M=α/a or M=β/b between the predetermined two-dimensional plane and the predetermined three-dimensional space may be determined.

By determining the mapping relationship, the size information of the object projected onto the predetermined two-dimensional plane may be converted into the size information of the object in the predetermined three-dimensional space, which may facilitate a construction of the bounding box for the object.

Figure 4:
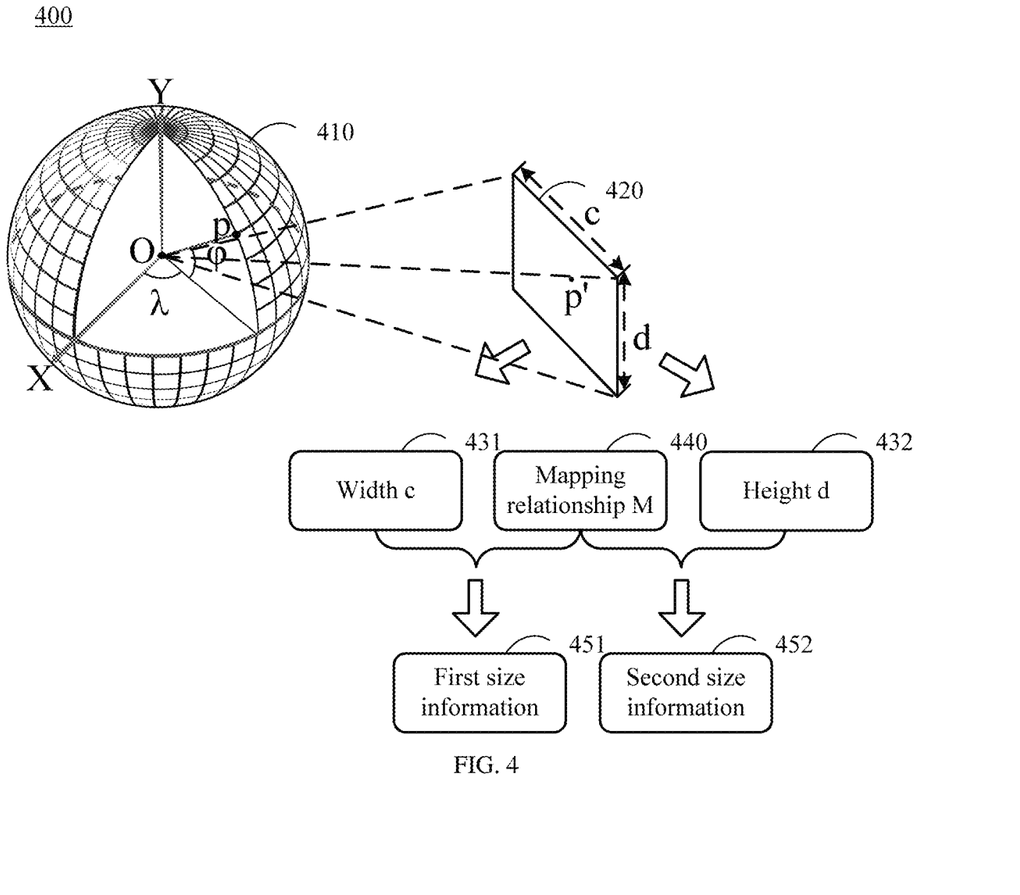
FIG. 4 shows a schematic diagram of determining a size information of a bounding box for each object according to an embodiment of the present disclosure.

FIG. 4 shows a schematic diagram of determining the size information of the bounding box for each object according to an embodiment of the present disclosure.

According to the embodiment of the present disclosure, the rotation position of the object relative to the predetermined three-dimensional space may include a first rotation angle of the center point of the object relative to a first coordinate axis and a second rotation angle of the center point of the object relative to a second coordinate axis in a spherical coordinate system constructed based on the predetermined three-dimensional space. The first rotation angle and the second rotation angle are perpendicular to each other.

Exemplarily, in an embodiment 400 shown in FIG. 4, the spherical coordinate system may be established with a center point O of a three-dimensional sphere model 410 as a coordinate origin. If the center point of the object is point p on a sphere surface, the rotation position of the object relative to the predetermined three-dimensional space may include a rotation angle q of the point p relative to an X axis and a rotation angle A of the point p relative to a Y axis. The rotation angle of the point p relative to the X axis and the rotation angle of the point p relative to the Y axis may be determined according to a right-hand rotation rule. Specifically, when a pointing direction of a thumb is perpendicular to a bending direction of the other four fingers, the pointing direction of the thumb is a positive direction of a rotation axis, and the bending direction of the other four fingers is a positive rotation direction to determine the rotation angle relative to the rotation axis.

According to the embodiment of the present disclosure, the present disclosure may also be implemented to, for example, determine the rotation position according to the azimuth angle value and the pitch angle value of the center point of the object in the constructed spherical coordinate system.

According to the embodiment of the present disclosure, after the mapping relationship is determined, the conversion between the size information of the object projected onto the predetermined two-dimensional plane and the size information of the object in the predetermined three-dimensional space may be achieved. A display form of the object in the predetermined two-dimensional space is generally a rectangular frame 420, then the size information of the object projected onto the predetermined two-dimensional plane may include the width of the object and the height of the object. For example, in the embodiment 400 shown in FIG. 4, the size information projected onto the predetermined two-dimensional plane includes a width c 431 and a height d 432. The center point p of the object corresponds to a point p' projected onto the predetermined two-dimensional plane.

According to the embodiment of the present disclosure, a first size information of the bounding box for each object may be determined according to the mapping relationship and the width of each object. The first size information may represent, for example, half of an azimuth size of the bounding box in the spherical coordinate system constructed based on the predetermined three-dimensional space, that is, an upper limit value of an absolute value of the rotation angle in the horizontal direction with the center point of the object as an origin when the width is mapped to the predetermined three-dimensional space. A second size information of the bounding box for each object may be determined according to the mapping relationship and the height of each object. The second size information may represent, for example, a pitch size of the bounding box in the spherical coordinate system constructed based on the predetermined three-dimensional space, that is, an upper limit value of an absolute value of the rotation angle allowed in a pitch direction with the center point of the object as an origin when the height is mapped to the predetermined three-dimensional space.

Exemplarily, as shown in FIG. 4, according to the width c 431 of the object and the mapping relationship M440 determined above, it may be determined that the azimuth size of the bounding box in the spherical coordinate system constructed based on the predetermined three-dimensional space is c*M, then the first size information 451 may be represented as W=0.5*c*M. According to the height d 432 of the object and the mapping relationship M440 determined above, it may be obtained that the pitch size of the bounding box in the spherical coordinate system constructed based on the predetermined three-dimensional space is d*M, then the second size information 452 may be expressed as H=0.5*d*M.

Exemplarily, when the bounding box for the object is a rectangle on the predetermined two-dimensional plane, the first size information 451 and the second size information 452 determined above are size information of the bounding box. The size information together with a coordinate value of the rotation position of the object in the predetermined three-dimensional space constitute a bounding box information. By setting the bounding box, which is a rectangle on the predetermined two-dimensional plane, the size of the bounding box may be reduced as much as possible while ensuring that the bounding box completely surrounds the object, so that a detection accuracy may be improved and an incorrect determination of the collision result may be avoided.

Exemplarily, when the bounding box for the object is a circle on the predetermined two-dimensional plane, after the first size information 451 and the second size information 452 are determined, for example, a greater value of the first size information 451 and the second size information 452 may be determined as the size information of the bounding box for the object, so as to ensure that the bounding box completely surrounds the object. Specifically, it may be determined that the size information of the bounding box for the object is R=max (H, W).

Figure 5:
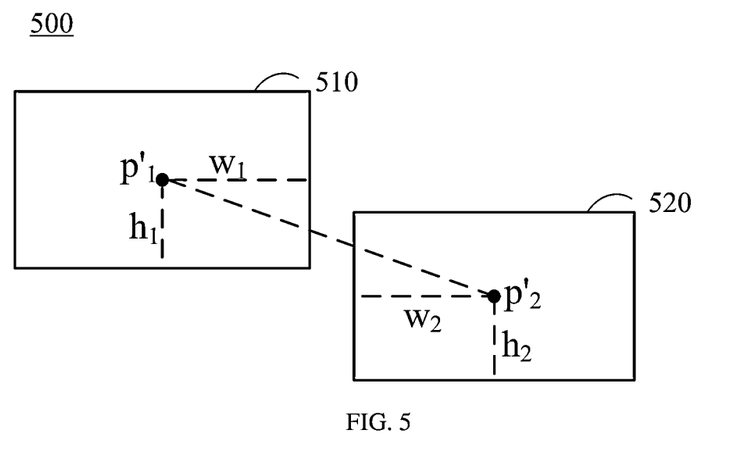
FIG. 5 shows a schematic diagram of determining a collision result for two objects according to an embodiment of the present disclosure.

FIG. 5 shows a schematic diagram of determining a collision result for two objects according to an embodiment of the present disclosure.

According to the embodiment of the present disclosure, as shown in FIG. 5, when the shape obtained by projecting the bounding box onto the predetermined two-dimensional plane is a rectangle, an embodiment 500 may be implemented to obtain, for example, rectangle 510 and rectangle 520 by projecting two bounding boxes for two objects onto the predetermined two-dimensional plane. In order that the two objects do not overlap when projected onto the predetermined two-dimensional plane, it is required that the rectangle 510 and the rectangle 520 do not overlap. That is, the rectangle 510 and the rectangle 520 need to meet a condition that a sum of a half width w1 of the rectangle 510 and a half width w2 of the rectangle 520 are less than or equal to a distance between a point p1' and a point pz' in the width direction, and a sum of a half height h1 of the rectangle 510 and a half height h2 of the rectangle 520 are less than or equal to a distance between the point p1' and the point pz' in the height direction, where p1' is a center point of one of the two objects projected onto the predetermined two-dimensional plane (that is, a center point of the bounding box for one object projected onto the predetermined two-dimensional plane), and pz' is a center point of the other of the two objects projected onto the predetermined two-dimensional plane (that is, a center point of the bounding box for the other object projected onto the predetermined two-dimensional plane). By mapping this condition to the predetermined three-dimensional space according to the mapping relationship, the following condition may be obtained.

$$(W_1+W_2) \le \text{diff } \lambda, \text{ where diff } \lambda=|\lambda_1-\lambda_2|;$$

$$(H_1+H_2) \le \text{diff } \varphi, \text{ where diff } \varphi=|\varphi_1-\varphi_2|.$$

where $W_1$ represents the first size information of the bounding box for one of the objects, $H_1$ represents the second size information of the bounding box for one of the objects, $W_2$ represents the first size information of the bounding box for the other of the objects, $H_2$ represents the second size information of the bounding box for the other of the objects, $\lambda_1$ represents the first rotation angle of one of the objects, that is, the rotation angle of one of the objects relative to the Y axis described above, $\varphi_1$ represents the second rotation angle of one of the objects, that is, the rotation angle of one of the objects relative to the X axis described above, $\lambda_2$ represents the first rotation angle of the other object, that is, the rotation angle of the other object relative to the Y axis described above, and $\varphi_2$ represents the second rotation angle of the other object, that is, the rotation angle of the other object relative to the X axis described above.

In this embodiment, when determining the collision result for the two objects, a first difference value diff $\lambda$ between the two first rotation angles of the two objects and a second difference value diff $\varphi$ between the second rotation angles of the two objects may be determined first. Then, according to the size of the bounding box determined above, a sum of the first size information of the two bounding boxes for the two objects is determined to obtain a first size sum $(W_1+W_2)$, and a sum of the second size information of the two bounding boxes for the two objects is determined to obtain a second size sum $(H_1+H_2)$. The collision result for the two objects may be determined according to a size relationship between the first difference value diff $\lambda$ and the first size sum $(W_1+W_2)$ and a size relationship between the second difference value diff $\varphi$ and the second size sum $(H_1+H_2)$. If the first size sum $(W_1+W_2)$ is greater than the first difference diff $\lambda$, or the second size sum $(H_1+H_2)$ is greater than the second difference value diff $\varphi$, the collision result may indicate that the two objects collide, otherwise the collision result may indicate that the two objects do not collide.

Figure 6:
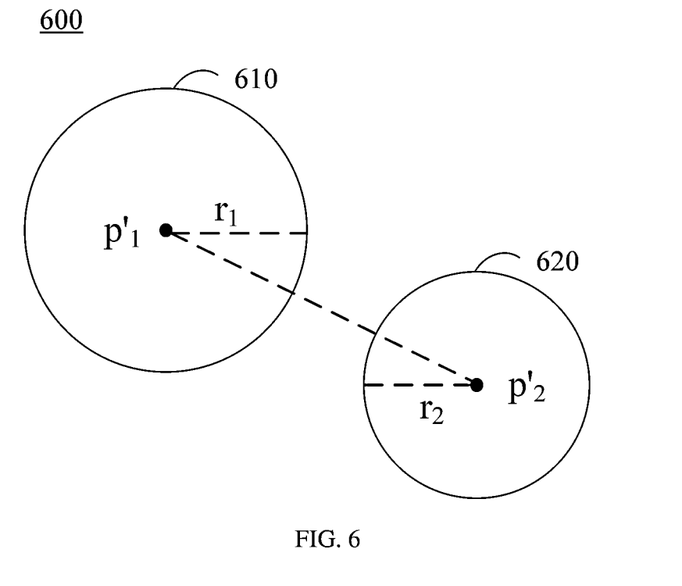
FIG. 6 shows a schematic diagram of determining a collision result for two objects according to another embodiment of the present disclosure.

FIG. 6 shows a schematic diagram of determining a collision result for two objects according to another embodiment of the present disclosure.

According to an embodiment of the present disclosure, as shown in FIG. 6, when a shape obtained by projecting the bounding box onto the predetermined two-dimensional plane is a circle, an embodiment 600 may be implemented to obtain, for example, circle 610 and circle 620 by projecting two bounding boxes for two objects onto the predetermined two-dimensional plane. In order that the two objects do not overlap when projected onto the predetermined two-dimensional plane, it is required that the circle 610 and the circle 620 do not overlap. That is, the circle 610 and the circle 620 need to satisfy a condition that a sum of a radius $r_1$ of the circle 610 and a radius $r_2$ of the circle 620 are less than or equal to a distance between a point $p_1'$ and a point $p_2'$, where $p_1'$ is a center point of one of the two objects projected onto the predetermined two-dimensional plane (that is, a center point of the bounding box for one of the objects projected onto the predetermined two-dimensional plane), and $p_2'$ represents a center point of the other of the two objects projected onto the predetermined two-dimensional plane (that is, a center point of the bounding box for the other object onto the predetermined two-dimensional plane). By mapping this condition to the predetermined three-dimensional space according to the mapping relationship, the following condition may be obtained.

$$(R_1+R_2) \le (\text{diff } \lambda^2 + \text{diff } \varphi^2)^{1/2}, \text{ where diff } \lambda=|>\lambda_1-\lambda_2|,$$
$$\text{diff } \varphi=|\varphi_1-\varphi_2|.$$

where $R_1$ represents the size information of the bounding box for one object, $R_2$ represents the size information of the bounding box for the other object, $\lambda_1$ represents the first rotation angle of one object, that is, the rotation angle of one object relative to the Y axis described above, $\varphi_1$ represents the second rotation angle of one object, that is, the rotation angle of one object relative to the X axis described above, $\lambda_2$ represents the first rotation angle of the other object, that is, the rotation angle of the other object relative to the Y axis described above, and $\varphi_2$ represents the second rotation angle of the other object, that is, the rotation angle of the other object relative to the X axis described above.

In this embodiment, when determining the collision result for the two objects, a first difference value diff $\lambda$ between the two first rotation angles of the two objects and a second difference value diff $\varphi$ between the second rotation angles of the two objects may be determined. Then, according to the size of the bounding box determined above, a sum of the size information of the two bounding boxes for the two objects is determined to obtain a first size sum $(R_1+R_2)$. The collision result for the two objects is determined according to a size relationship between the size sum $(R_1+R_2)$ and an arithmetic square root of the first difference value diff $\lambda$ and the second difference value diff $\varphi$, which is $[(\text{diff } \lambda^2+\text{diff } \varphi^2)^{1/2}]$. If the size sum $(R_1+R_2)$ is greater than the arithmetic square root $[(\text{diff } \lambda^2 + \text{diff } \varphi^2)^{1/2}]$, the collision result may indicate that the two objects collide; otherwise, the collision result may indicate that the two objects do not collide.

In a panoramic scene of a map navigation, a label added to an entity in a panoramic picture may act as the object, and the method of detecting the collision of objects described above may be used to perform a collision detection on any two objects, so as to obtain the labels that may overlap each other during the panorama display from all the added labels. For two labels that may overlap each other, for example, a label with a greater weight value may be selected from the two labels for display according to pre-assigned weight values for the two labels. In this way, the overall visual experience in the current field of view in the panoramic scene of map navigation may be improved, and thus the user experience may be improved. It may be understood that the pre-assigned weight value may be set according to actual needs. For example, it may be set according to a click frequency. The higher the click frequency, the greater the pre-assigned weight value.

It may be understood that the aforementioned case of the label acting as the object is only illustrated by way of example to facilitate understanding of the present disclosure, and the method of detecting the collision of objects provided in the present disclosure may be applied to any scene in which the collision detection is required.

According to the above-mentioned method of detecting the collision of objects, the present disclosure further provides an apparatus of detecting a collision of objects, which will be described in detail below with reference to FIG. 7.

Figure 7:
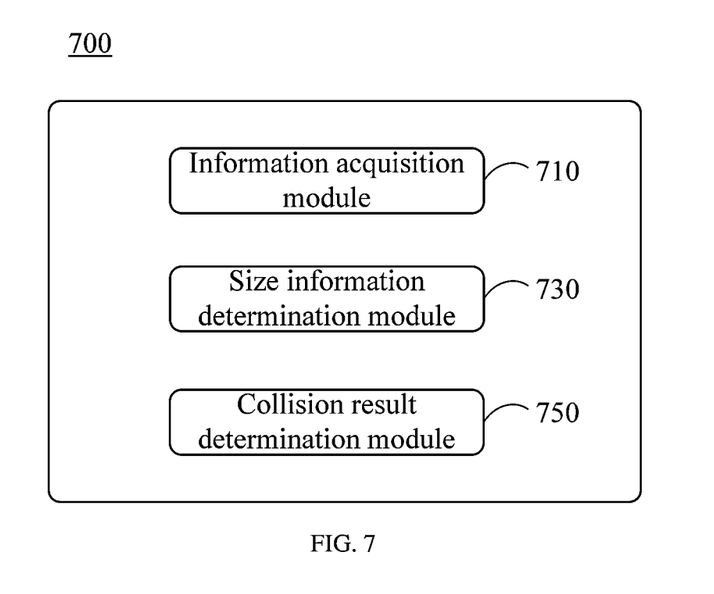
FIG. 7 shows a structural block diagram of an apparatus of detecting a collision of objects according to an embodiment of the present disclosure.

FIG. 7 shows a structural block diagram of an apparatus of detecting a collision of objects according to an embodiment of the present disclosure.

As shown in FIG. 7, an apparatus 700 of detecting a collision of objects in this embodiment may include an information acquisition module 710, a size information determination module 730 and a collision result determination module 750.

The information acquisition module 710 is used to acquire an attribute information of each of two objects. The attribute information includes a rotation position of the object relative to a predetermined three-dimensional space and a size information of the object projected onto a predetermined two-dimensional plane. In an embodiment, the information acquisition module 710 may be used to perform, for example, the operation S210 described above, which will not be repeated here.

The size information determination module 730 is used to determine a size information of a bounding box for each of the two objects according to the size information of each of the two objects. A center of the bounding box is located at a rotation position of the object. In an embodiment, the size information determination module 730 may be used to perform, for example, the operation S230 described above, which will not be repeated here.

The collision result determination module 750 is used to determine a collision result for the two objects according to the rotation positions of the two objects and the size information of the bounding boxes for the two objects. In an embodiment, the collision result determination module 750 may be used to perform, for example, the operation S250 described above, which will not be repeated here.

According to an embodiment of the present disclosure, the size information determination module 730 may include, for example, a mapping relationship determination sub-module and a size information determination sub-module. The mapping relationship determination sub-module is used to determine a mapping relationship between the predetermined two-dimensional plane and the predetermined three-dimensional space. The size information determination sub-module is used to determine the size information of the bounding box for each object according to the mapping relationship and the size information of each object.

According to an embodiment of the present disclosure, the mapping relationship determination sub-module may include a viewing angle value acquisition unit, a width acquisition unit, and a relationship determination unit. The viewing angle value acquisition unit is used to acquire a viewing angle value of a center point of the predetermined three-dimensional space in a predetermined direction with respect to the predetermined two-dimensional plane. The width acquisition unit is used to acquire a width of the predetermined two-dimensional plane in the predetermined direction. The relationship determination unit is used to determine the mapping relationship between the predetermined two-dimensional plane and the predetermined three-dimensional space as a ratio of the viewing angle value to the width.

According to an embodiment of the present disclosure, the rotation position of the object relative to the three-dimensional space may include a first rotation angle of the center point of the object with a first coordinate axis as a rotation axis in a spherical coordinate system constructed based on the predetermined three-dimensional space and a second rotation angle of the center point of the object with a second coordinate axis as a rotation axis in the spherical coordinate system constructed based on the predetermined three-dimensional space. The first rotation angle and the second rotation angle are perpendicular to each other.

According to an embodiment of the present disclosure, the size information of the object projected onto the predetermined two-dimensional plane may include a width of the object and a height of the object. The size information determination sub-module may include, for example, an azimuth size determination unit and a pitch size determination unit. The azimuth size determination unit is used to determine a first size information of the bounding box for each object according to the mapping relationship and the width of each object, where the first size information includes half of the azimuth size of the bounding box in the spherical coordinate system constructed based on the predetermined three-dimensional space. The pitch size determination unit is used to determine a second size information of the bounding box for each object according to the mapping relationship and the height of each object, where the second size information includes half of a pitch size of the bounding box in the spherical coordinate system constructed based on the predetermined three-dimensional space.

According to an embodiment of the present disclosure, the collision result determination module may include, for example, a first difference determination sub-module, a first size sum determination sub-module, and a first collision determination sub-module. The first difference determination sub-module is used to determine a first difference value between two first rotation angles of the two objects and determine a second difference value between two second rotation angles of the two objects. The first size sum determination sub-module is used to determine a sum of the first size information of the two bounding boxes for the two objects, so as to obtain a first size sum; and is further used to determine a sum of the second size information of the two bounding boxes for the two objects, so as to obtain a second size sum. The first collision determination sub-module is used to determine a collision result for the two objects according to a size relationship between the first difference value and the first size sum and a size relationship between the second difference value and the second size sum.

According to an embodiment of the present disclosure, the size information determination sub-module may further include a size information determination unit used to determine a greater value of the first size information and the second size information as the size information of the bounding box for each object.

According to an embodiment of the present disclosure, the collision result determination module may include a second difference determination sub-module, a second size sum determination sub-module, and a second collision determination sub-module. The second difference determination sub-module is used to determine the first difference value between the two first rotation angles of the two objects, and determine the second difference value between the two second rotation angles of the two objects. The second size sum determination sub-module is used to determine a sum of the size information of the two bounding boxes for the two objects, so as to obtain a size sum. The second collision determination sub-module is used to determine the collision result for the two objects according to a size relationship between the size sum and an arithmetic square root of the first difference value and the second difference value.

In this technical solution of the present disclosure, authorization or consent is obtained from the user before the user's personal information is obtained or collected.

In the technical solution of the present disclosure, an acquisition, a storage, a use, a processing, a transmission, a provision and a disclosure of user personal information involved comply with provisions of relevant laws and regulations, and do not violate public order and good custom.

According to an embodiment of the present disclosure, the present disclosure further provides an electronic device, a readable storage medium, and a computer program product.

Figure 8:
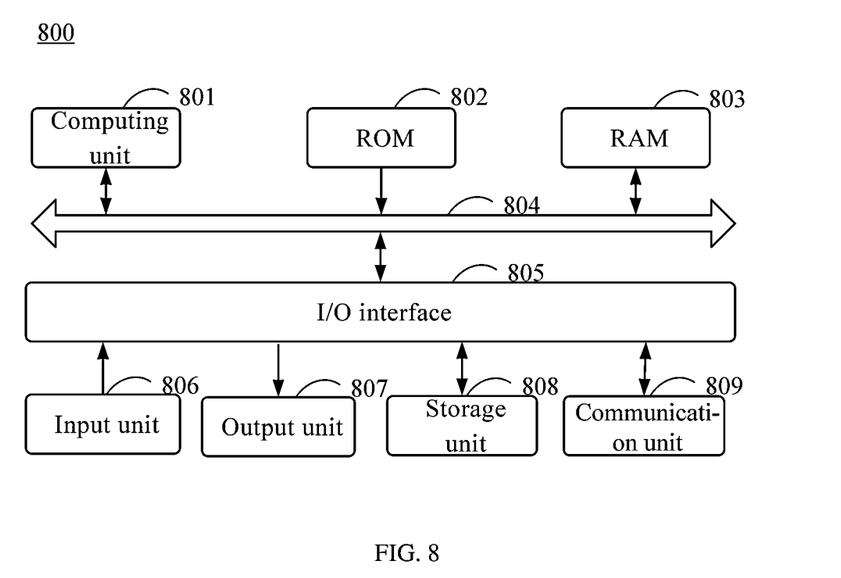
FIG. 8 shows a block diagram of an electronic device for implementing the method of detecting the collision of objects according to the embodiment of the present disclosure.

FIG. 8 shows a schematic block diagram of an exemplary electronic device 800 that may be used to implement the method of detecting the collision of objects of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 8, the electronic device 800 may include a computing unit 801, which may perform various appropriate actions and processing based on a computer program stored in a read-only memory (ROM) 802 or a computer program loaded from a storage unit 808 into a random access memory (RAM) 803. Various programs and data required for the operation of the electronic device 800 may be stored in the RAM 803. The computing unit 801, the ROM 802 and the RAM 803 are connected to each other through a bus 804. An input/output (I/O) interface 805 is further connected to the bus 804.

Various components in the electronic device 800, including an input unit 806 such as a keyboard, a mouse, etc., an output unit 807 such as various types of displays, speakers, etc., a storage unit 808 such as a magnetic disk, an optical disk, etc., and a communication unit 809 such as a network card, a modem, a wireless communication transceiver, etc., are connected to the I/O interface 805. The communication unit 809 allows the electronic device 800 to exchange information/data with other devices through a computer network such as the Internet and/or various telecommunication networks.

The computing unit 801 may be various general-purpose and/or special-purpose processing components with processing and computing capabilities. Some examples of the computing unit 801 include but are not limited to a central processing unit (CPU), a graphics processing unit (GPU), various dedicated artificial intelligence (AI) computing chips, various computing units running machine learning model algorithms, a digital signal processor (DSP), and any appropriate processor, controller, microcontroller, and so on. The computing unit 801 may perform the various methods and processes described above, such as the method of detecting the collision of objects. For example, in some embodiments, the method of detecting the collision of objects may be implemented as a computer software program that is tangibly contained on a machine-readable medium, such as the storage unit 808. In some embodiments, part or all of a computer program may be loaded and/or installed on the electronic device 800 via the ROM 802 and/or the communication unit 809. When the computer program is loaded into the RAM 803 and executed by the computing unit 801, one or more steps of the method of detecting the collision of objects described above may be performed. Alternatively, in other embodiments, the computing unit 801 may be configured to perform the method of detecting the collision of objects in any other appropriate way (for example, by means of firmware).

Various embodiments of the systems and technologies described herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from the storage system, the at least one input device and the at least one output device, and may transmit the data and instructions to the storage system, the at least one input device, and the at least one output device.

Program codes for implementing the method of the present disclosure may be written in any combination of one or more programming languages. These program codes may be provided to a processor or a controller of a general-purpose computer, a special-purpose computer, or other programmable data processing devices, so that when the program codes are executed by the processor or the controller, the functions/operations specified in the flowchart and/or block diagram may be implemented. The program codes may be executed completely on the machine, partly on the machine, partly on the machine and partly on the remote machine as an independent software package, or completely on the remote machine or the server.

In the context of the present disclosure, the machine readable medium may be a tangible medium that may contain or store programs for use by or in combination with an instruction execution system, device or apparatus. The machine readable medium may be a machine-readable signal medium or a machine-readable storage medium. The machine readable medium may include, but not be limited to, electronic, magnetic, optical, electromagnetic, infrared or semiconductor systems, devices or apparatuses, or any suitable combination of the above. More specific examples of the machine readable storage medium may include electrical connections based on one or more wires, portable computer disks, hard disks, random access memory (RAM), read-only memory (ROM), erasable programmable read-only memory (EPROM or flash memory), optical fiber, convenient compact disk read-only memory (CD-ROM), optical storage device, magnetic storage device, or any suitable combination of the above.

In order to provide interaction with users, the systems and techniques described here may be implemented on a computer including a display device (for example, a CRT (cathode ray tube) or LCD (liquid crystal display) monitor) for displaying information to the user), and a keyboard and a pointing device (for example, a mouse or a trackball) through which the user may provide the input to the computer. Other types of devices may also be used to provide interaction with users. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and Internet.

The computer system may include a client and a server. The client and the server are generally far away from each other and usually interact through a communication network. The relationship between the client and the server is generated through computer programs running on the corresponding computers and having a client-server relationship with each other. The server may be a cloud server, a server of a distributed system, or a server combined with a blockchain.

Embodiments are provided according to the following clauses:

1. A method of detecting a collision of objects, comprising:
   acquiring an attribute information of each of two objects, wherein the attribute information comprises a rotation position of the object relative to a predetermined three-dimensional space and a size information of the object projected onto a predetermined two-dimensional plane;
   determining a size information of a bounding box for each object of the two objects based on the size information of the each object, wherein a center of the bounding box is located at the rotation position of the each object; and
   determining a collision result for the two objects according to the rotation positions of the two objects and the size information of the bounding boxes for the two objects.

2. The method of clause 1, wherein the determining a size information of a bounding box for each object comprises:
   determining a mapping relationship between the predetermined two-dimensional plane and the predetermined three-dimensional space; and
   determining the size information of the bounding box for the each object based on the mapping relationship and the size information of the each object.

3. The method of clause 2, wherein the determining a mapping relationship between the predetermined two-dimensional plane and the predetermined three-dimensional space comprises:
   acquiring a viewing angle value of a center point of the predetermined three-dimensional space in a predetermined direction with respect to the predetermined two-dimensional plane;
   acquiring a width of the predetermined two-dimensional plane in the predetermined direction; and
   determining the mapping relationship between the predetermined two-dimensional plane and the predetermined three-dimensional space as a ratio of the viewing angle value to the width.

4. The method of clause 2 or 3, wherein the rotation position of the each object relative to the three-dimensional space comprises:
   a first rotation angle of a center point of the each object with a first coordinate axis as a rotation axis in a spherical coordinate system constructed based on the predetermined three-dimensional space; and
   a second rotation angle of the center point of the each object with a second coordinate axis as a rotation axis in the spherical coordinate system constructed based on the predetermined three-dimensional space,
   wherein the first coordinate axis and the second coordinate axis are perpendicular to each other.

5. The method of clause 4, wherein the size information of the each object projected onto the predetermined two-dimensional plane comprises a width of the each object and a height of the each object; and the determining a size information of a bounding box for each object comprises:
   determining a first size information of the bounding box for the each object according to the mapping relationship and the width of the each object, wherein the first size information comprises half of an azimuth size of the bounding box in the spherical coordinate system constructed based on the predetermined three-dimensional space; and determining a second size information of the bounding box for the each object according to the mapping relationship and the height of the each object, wherein the second size information comprises half of a pitch size of the bounding box in the spherical coordinate system constructed based on the predetermined three-dimensional space.

6. The method of clause 5, wherein the determining a collision result for the two objects comprises:
   determining a first difference value between two first rotation angles of the two objects, and determining a second difference value between two second rotation angles of the two objects;

determining a sum of the first size information of the two bounding boxes for the two objects, so as to obtain a first size sum, and determining a sum of the second size information of the two bounding boxes for the two objects, so as to obtain a second size sum; and determining the collision result for the two objects based on a size relationship between the first difference value and the first size sum and a size relationship between the second difference value and the second size sum.

7. The method of clause 5, wherein the determining a size information of a bounding box for each object comprises:

determining a greater value of the first size information and the second size information as the size information of the bounding box for the each object.

8. The method of clause 7, wherein the determining a collision result for the two objects comprises:

determining a first difference value between two first rotation angles of the two objects, and determining a second difference value between two second rotation angles of the two objects;

determining a sum of the size information of the two bounding boxes for the two objects, so as to obtain a size sum; and determining the collision result for the two objects based on a size relationship between the size sum and an arithmetic square root of the first difference value and the second difference value.

9. An apparatus of detecting a collision of objects, comprising:

an information acquisition module configured to acquire an attribute information of each of two objects, wherein the attribute information comprises a rotation position of the object relative to a predetermined three-dimensional space and a size information of the object projected onto a predetermined two-dimensional plane;

a size information determination module configured to determine a size information of a bounding box for each object of the two objects based on the size information of the each object, wherein a center of the bounding box is located at the rotation position of the each object; and a collision result determination module configured to determine a collision result for the two objects according to the rotation positions of the two objects and the size information of the bounding boxes for the two objects.

10. The apparatus of clause 9, wherein the size information determination module comprises:

a mapping relationship determination sub-module configured to determine a mapping relationship between the predetermined two-dimensional plane and the predetermined three-dimensional space; and a size information determination sub-module configured to determine the size information of the bounding box for the each object based on the mapping relationship and the size information of the each object.

11. The apparatus of clause 10, wherein the mapping relationship determination sub-module comprises:

a viewing angle value acquisition unit configured to acquire a viewing angle value of a center point of the predetermined three-dimensional space in a predetermined direction with respect to the predetermined two-dimensional plane;

a width acquisition unit configured to acquire a width of the predetermined two-dimensional plane in the predetermined direction; and a relationship determination unit configured to determine the mapping relationship between the predetermined two-dimensional plane and the predetermined three-dimensional space as a ratio of the viewing angle value to the width.

12. The apparatus of clause 10 or 11, wherein the rotation position of the object relative to the three-dimensional space comprises:

a first rotation angle of a center point of the each object with a first coordinate axis as a rotation axis in a spherical coordinate system constructed based on the predetermined three-dimensional space; and a second rotation angle of the center point of the each object with a second coordinate axis as a rotation axis in the spherical coordinate system constructed based on the predetermined three-dimensional space, wherein the first coordinate axis and the second coordinate axis are perpendicular to each other.

13. The apparatus of clause 12, wherein the size information of the each object projected onto the predetermined two-dimensional plane comprises a width of the each object and a height of the each object; and the size information determination sub-module comprises:

an azimuth size determination unit configured to determine a first size information of the bounding box for the each object according to the mapping relationship and the width of the each object, wherein the first size information comprises half of an azimuth size of the bounding box in the spherical coordinate system constructed based on the predetermined three-dimensional space; and a pitch size determination unit configured to determine a second size information of the bounding box for the each object according to the mapping relationship and the height of the each object, wherein the second size information comprises half of a pitch size of the bounding box in the spherical coordinate system constructed based on the predetermined three-dimensional space.

14. The apparatus of clause 13, wherein the collision result determination module comprises:

a first difference determination sub-module configured to determine a first difference value between two first rotation angles of the two objects, and determine a second difference value between two second rotation angles of the two objects;

a first size sum determination sub-module configured to determine a sum of the first size information of the two bounding boxes for the two objects, so as to obtain a first size sum, and determine a sum of the second size information of the two bounding boxes for the two objects, so as to obtain a second size sum; and a first collision determination sub-module configured to determine the collision result for the two objects based on a size relationship between the first difference value and the first size sum and a size relationship between the second difference value and the second size sum.

15. The apparatus of clause 13, wherein the size information determination sub-module further comprises:

a size information determination unit configured to determine a greater value of the first size information and the second size information as the size information of the bounding box for the each object.

16. The apparatus of clause 15, wherein the collision result determination module comprises:

a second difference determination sub-module configured to determine a first difference value between two first rotation angles of the two objects, and determine a second difference value between two second rotation angles of the two objects;
a second size sum determination sub-module configured to determine a sum of the size information of the two bounding boxes for the two objects, so as to obtain a size sum; and
a second collision determination sub-module configured to determine the collision result for the two objects based on a size relationship between the size sum and an arithmetic square root of the first difference value and the second difference value.

17. An electronic device, comprising:
at least one processor; and
a memory communicatively connected to the at least one processor, wherein the memory stores instructions executable by the at least one processor, and the instructions, when executed by the at least one processor, cause the at least one processor to implement the method of any one of clauses 1 to 8.

18. A non-transitory computer-readable storage medium having computer instructions stored thereon, wherein the computer instructions allow a computer to implement the method of any one of clauses 1 to 8.

19. A computer program product containing a computer program, wherein the computer program, when executed by a processor, is allowed to implement the method of any one of clauses 1 to 8.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A method of detecting a collision of objects, the method comprising:
acquiring an attribute information of each of two objects, wherein the attribute information comprises a rotation position of the object relative to a predetermined three-dimensional space and a size information of the object projected onto a predetermined two-dimensional plane;
obtaining a mapping relationship between the predetermined two-dimensional plane and the predetermined three-dimensional space;
determining a size information of a bounding box for each object of the two objects based on the mapping relationship and on the size information of the each object, wherein a center of the bounding box is located at the rotation position of the each object;
determining a collision result for the two objects according to the rotation positions of the two objects and the size information of the bounding boxes for the two objects.

2. The method of claim 1, wherein the obtaining a mapping relationship between the predetermined two-dimensional plane and the predetermined three-dimensional space comprises:
acquiring a viewing angle value of a center point of the predetermined three-dimensional space in a predetermined direction with respect to the predetermined two-dimensional plane;
acquiring a width of the predetermined two-dimensional plane in the predetermined direction; and
determining the mapping relationship between the predetermined two-dimensional plane and the predetermined three-dimensional space as a ratio of the viewing angle value to the width.

3. The method of claim 2, wherein the rotation position of the each object relative to the three-dimensional space comprises:
a first rotation angle of a center point of the each object with a first coordinate axis as a rotation axis in a spherical coordinate system constructed based on the predetermined three-dimensional space; and
a second rotation angle of the center point of the each object with a second coordinate axis as a rotation axis in the spherical coordinate system constructed based on the predetermined three-dimensional space,
wherein the first coordinate axis and the second coordinate axis are perpendicular to each other.

4. The method of claim 3, wherein the size information of the each object projected onto the predetermined two-dimensional plane comprises a width of the each object and a height of the each object; and the determining a size information of a bounding box for each object comprises:
determining a first size information of the bounding box for the each object according to the mapping relationship and the width of the each object, wherein the first size information comprises half of an azimuth size of the bounding box in the spherical coordinate system constructed based on the predetermined three-dimensional space; and
determining a second size information of the bounding box for the each object according to the mapping relationship and the height of the each object, wherein the second size information comprises half of a pitch size of the bounding box in the spherical coordinate system constructed based on the predetermined three-dimensional space.

5. The method of claim 4, wherein the determining a collision result for the two objects comprises:
determining a first difference value between two first rotation angles of the two objects, and determining a second difference value between two second rotation angles of the two objects;
determining a sum of the first size information of the two bounding boxes for the two objects, so as to obtain a first size sum, and determining a sum of the second size information of the two bounding boxes for the two objects, so as to obtain a second size sum; and
determining the collision result for the two objects based on a size relationship between the first difference value and the first size sum and a size relationship between the second difference value and the second size sum.

6. The method of claim 4, wherein the determining a size information of a bounding box for each object comprises:
determining a greater value of the first size information and the second size information as the size information of the bounding box for the each object.

7. The method of claim 6, wherein the determining a collision result for the two objects comprises:
- determining a first difference value between two first rotation angles of the two objects, and determining a second difference value between two second rotation angles of the two objects;
- determining a sum of the size information of the two bounding boxes for the two objects, so as to obtain a size sum; and
- determining the collision result for the two objects based on a size relationship between the size sum and an arithmetic square root of the first difference value and the second difference value.

8. The method of claim 1, wherein the rotation position of the each object relative to the three-dimensional space comprises:
- a first rotation angle of a center point of the each object with a first coordinate axis as a rotation axis in a spherical coordinate system constructed based on the predetermined three-dimensional space; and
- a second rotation angle of the center point of the each object with a second coordinate axis as a rotation axis in the spherical coordinate system constructed based on the predetermined three-dimensional space,
- wherein the first coordinate axis and the second coordinate axis are perpendicular to each other.

9. The method of claim 8, wherein the size information of the each object projected onto the predetermined two-dimensional plane comprises a width of the each object and a height of the each object; and the determining a size information of a bounding box for each object comprises:
- determining a first size information of the bounding box for the each object according to the mapping relationship and the width of the each object, wherein the first size information comprises half of an azimuth size of the bounding box in the spherical coordinate system constructed based on the predetermined three-dimensional space; and
- determining a second size information of the bounding box for the each object according to the mapping relationship and the height of the each, wherein the second size information comprises half of a pitch size of the bounding box in the spherical coordinate system constructed based on the predetermined three-dimensional space.

10. The method of claim 9, wherein the determining a collision result for the two objects comprises:
- determining a first difference value between two first rotation angles of the two objects, and determining a second difference value between two second rotation angles of the two objects;
- determining a sum of the first size information of the two bounding boxes for the two objects, so as to obtain a first size sum, and determining a sum of the second size information of the two bounding boxes for the two objects, so as to obtain a second size sum; and
- determining the collision result for the two objects based on a size relationship between the first difference value and the first size sum and a size relationship between the second difference value and the second size sum.

11. The method of claim 9, wherein the determining a size information of a bounding box for each object comprises determining a greater value of the first size information and the second size information as the size information of the bounding box for the each object.

12. The method of claim 11, wherein the determining a collision result for the two objects comprises:
- determining a first difference value between two first rotation angles of the two objects, and determining a second difference value between two second rotation angles of the two objects;
- determining a sum of the size information of the two bounding boxes for the two objects, so as to obtain a size sum; and
- determining the collision result for the two objects based on a size relationship between the size sum and an arithmetic square root of the first difference value and the second difference value.

13. An electronic device, comprising:
- at least one processor; and
- a memory communicatively connected to the at least one processor, wherein the memory stores instructions executable by the at least one processor, and the instructions, when executed by the at least one processor, cause the at least one processor to at least:
- acquire an attribute information of each of two objects, wherein the attribute information comprises a rotation position of the object relative to a predetermined three-dimensional space and a size information of the object projected onto a predetermined two-dimensional plane;
- obtain a mapping relationship between the predetermined two-dimensional plane and the predetermined three-dimensional space;
- determine a size information of a bounding box for each object of the two objects based on the mapping relationship and on the size information of the each object, wherein a center of the bounding box is located at the rotation position of the each object; and
- determine a collision result for the two objects according to the rotation positions of the two objects and the size information of the bounding boxes for the two objects.

14. The electronic device of claim 13, wherein the instructions are further configured cause the at least one processor to:
- acquire a viewing angle value of a center point of the predetermined three-dimensional space in a predetermined direction with respect to the predetermined two-dimensional plane;
- acquire a width of the predetermined two-dimensional plane in the predetermined direction; and
- determine the mapping relationship between the predetermined two-dimensional plane and the predetermined three-dimensional space as a ratio of the viewing angle value to the width.

15. The electronic device of claim 13, wherein the rotation position of the each object relative to the three-dimensional space comprises:
- a first rotation angle of a center point of the each object with a first coordinate axis as a rotation axis in a spherical coordinate system constructed based on the predetermined three-dimensional space; and
- a second rotation angle of the center point of the each object with a second coordinate axis as a rotation axis in the spherical coordinate system constructed based on the predetermined three-dimensional space,
- wherein the first coordinate axis and the second coordinate axis are perpendicular to each other.

16. The electronic device of claim 15, wherein the size information of the each object projected onto the predetermined two-dimensional plane comprises a width of the each object and a height of the each object; and the instructions are further configured to cause the at least one processor to:
- determine a first size information of the bounding box for the each object according to the mapping relationship and the width of the each object, wherein the first size information comprises half of an azimuth size of the bounding box in the spherical coordinate system constructed based on the predetermined three-dimensional space; and determine a second size information of the bounding box for the each object according to the mapping relationship and the height of the each object, wherein the second size information comprises half of a pitch size of the bounding box in the spherical coordinate system constructed based on the predetermined three-dimensional space.

17. The electronic device of claim 16, wherein the instructions are further configured to cause the at least one processor to:

determine a first difference value between two first rotation angles of the two objects, and determine a second difference value between two second rotation angles of the two objects;

determine a sum of the first size information of the two bounding boxes for the two objects, so as to obtain a first size sum, and determine a sum of the second size information of the two bounding boxes for the two objects, so as to obtain a second size sum; and determine the collision result for the two objects based on a size relationship between the first difference value and the first size sum and a size relationship between the second difference value and the second size sum.

18. A non-transitory computer-readable storage medium having computer instructions therein, the computer instructions, when executed by a computer system, are configured to cause the computer system to at least:

acquire an attribute information of each of two objects, wherein the attribute information comprises a rotation position of the object relative to a predetermined three-dimensional space and a size information of the object projected onto a predetermined two-dimensional plane;

obtain a mapping relationship between the predetermined two-dimensional plane and the predetermined three-dimensional space;

determine a size information of a bounding box for each object of the two objects based on the mapping relationship and on the size information of the each object, wherein a center of the bounding box is located at the rotation position of the each object; and determine a collision result for the two objects according to the rotation positions of the two objects and the size information of the bounding boxes for the two objects.

19. The non-transitory computer-readable storage medium of claim 18, wherein the instructions are further configured cause the at least one processor to:

acquire a viewing angle value of a center point of the predetermined three-dimensional space in a predetermined direction with respect to the predetermined two-dimensional plane;

acquire a width of the predetermined two-dimensional plane in the predetermined direction; and determine the mapping relationship between the predetermined two-dimensional plane and the predetermined three-dimensional space as a ratio of the viewing angle value to the width.

20. The non-transitory computer-readable storage medium of claim 18, wherein the rotation position of the each object relative to the three-dimensional space comprises:

a first rotation angle of a center point of the each object with a first coordinate axis as a rotation axis in a spherical coordinate system constructed based on the predetermined three-dimensional space; and a second rotation angle of the center point of the each object with a second coordinate axis as a rotation axis in the spherical coordinate system constructed based on the predetermined three-dimensional space, wherein the first coordinate axis and the second coordinate axis are perpendicular to each other.

* * * * *